(12) United States Patent
Tsukahara et al.

(10) Patent No.: US 10,598,833 B2
(45) Date of Patent: Mar. 24, 2020

(54) DISPLAY

(71) Applicant: Toppan Printing Co., Ltd., Taito-ku, Tokyo (JP)

(72) Inventors: Toshiyuki Tsukahara, Tokyo (JP); Koichi Shinoda, Tokyo (JP); Takayoshi Hayashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 858 days.

(21) Appl. No.: 14/851,709

(22) Filed: Sep. 11, 2015

(65) Prior Publication Data

US 2016/0003990 A1 Jan. 7, 2016

Related U.S. Application Data

(63) Continuation of application No. PCT/JP2014/001223, filed on Mar. 5, 2014.

(30) Foreign Application Priority Data

Mar. 12, 2013 (JP) ................................. 2013-049426
Jun. 5, 2013 (JP) ................................. 2013-118648
Jun. 17, 2013 (JP) ................................. 2013-126655

(51) Int. Cl.
*G02B 5/18* (2006.01)
*B42D 25/328* (2014.01)
*G02B 5/02* (2006.01)

(52) U.S. Cl.
CPC ......... *G02B 5/1842* (2013.01); *B42D 25/328* (2014.10); *G02B 5/021* (2013.01); *G02B 5/1814* (2013.01)

(58) Field of Classification Search
None
See application file for complete search history.

(56) References Cited

U.S. PATENT DOCUMENTS

| 5,058,992 | A | 10/1991 | Takahashi |
| 2002/0030360 | A1 | 3/2002 | Herrmann et al. |
| 2005/0082819 | A1 | 4/2005 | Tompkin et al. |
| 2008/0160226 | A1 | 7/2008 | Kaule et al. |

(Continued)

FOREIGN PATENT DOCUMENTS

| DE | 10 2008 029 158 A1 | 6/2009 |
| EP | 2 077 459 A1 | 7/2009 |

(Continued)

OTHER PUBLICATIONS

Extended European Search Report issued in EP Patent Application No. 14763434.9 dated Sep. 12, 2016.

(Continued)

*Primary Examiner* — Darryl J Collins
*Assistant Examiner* — Journey F Sumlar
(74) *Attorney, Agent, or Firm* — Foley & Lardner LLP

(57) ABSTRACT

A display includes a transparent base having one surface on which a structure-forming layer, a light reflection layer and a protective layer are sequentially laminated. The light reflection layer reflects part of the incident light, while transmitting therethrough the rest of the light. The structure-forming layer includes a plurality of structure areas, and each of the plurality of structure areas is formed of a concavo-convex structure.

21 Claims, 16 Drawing Sheets

(56) References Cited

U.S. PATENT DOCUMENTS

| | | |
|---|---|---|
| 2009/0061159 A1 | 3/2009 | Staub et al. |
| 2009/0141355 A1* | 6/2009 | Thomas ................. B82Y 20/00 359/576 |
| 2009/0190223 A1 | 7/2009 | Petiton et al. |
| 2010/0001508 A1 | 1/2010 | Tompkin et al. |
| 2010/0045024 A1 | 2/2010 | Attner et al. |
| 2010/0254007 A1 | 10/2010 | Toda |
| 2012/0193905 A1 | 8/2012 | Schilling et al. |
| 2013/0285361 A1 | 10/2013 | Staub et al. |
| 2013/0319522 A1* | 12/2013 | Koike ............... H01L 31/02366 136/256 |
| 2014/0028012 A1 | 1/2014 | Petiton et al. |
| 2017/0028762 A1* | 2/2017 | Ide ....................... B42D 25/328 |
| 2018/0264869 A1 | 9/2018 | Schilling et al. |

FOREIGN PATENT DOCUMENTS

| | | |
|---|---|---|
| EP | 2 147 156 B1 | 1/2010 |
| EP | 2 219 168 A2 | 8/2010 |
| EP | 2 505 377 A1 | 10/2012 |
| JP | H08-013568 B2 | 2/1996 |
| JP | 2615401 B2 | 5/1997 |
| JP | 2751721 B2 | 5/1998 |
| JP | 2840724 B2 | 12/1998 |
| JP | 2005-292818 A | 10/2005 |
| JP | 2010-044267 A | 2/2010 |
| JP | 2011-118035 A | 6/2011 |
| JP | 2012-206352 A | 10/2012 |
| WO | WO-95/10420 A1 | 4/1995 |
| WO | WO-03/082598 A2 | 10/2003 |
| WO | WO-03/084764 A1 | 10/2003 |
| WO | WO-2006/087138 A1 | 8/2006 |
| WO | WO-2006/108607 A1 | 10/2006 |
| WO | WO-2008/095696 A1 | 8/2008 |
| WO | WO-2008/095698 A1 | 8/2008 |
| WO | WO-2011/029602 A1 | 3/2011 |
| WO | WO-2012/059208 A2 | 5/2012 |
| WO | WO-2012/136777 A1 | 10/2012 |

OTHER PUBLICATIONS

English-Language Translation of International Search Report and Written Opinion of the International Searching Authority issued in International Patent Application No. PCT/JP2014/001223 dated May 27, 2014.
European Patent Office, "Communication Pursuant to Rule 114(2) EPC," issued in connection with European Patent Application No. 14763434.9, dated Jun. 27, 2018.
EPO Office Action issued in the corresponding European Patent Application Ser. No. 14763434.9, dated Jun. 5, 2019.

* cited by examiner

A: Red
B: Yellow-red
C: Yellow
D: Yellow-green
E: Green
F: Blue-green
G: Blue
H: Blue-violet
I: Violet
J: (Violet-hued) pink
K: Pink
L: (Orange-hued) pink
M: (Light) yellow-red
N: (Light) yellow
O: (Light) yellow-green
P: (Light) green
Q: (Light) blue-green
R: (Light) blue
S: (Light) blue-violet
T: (Light) violet
U: (Violet-hued) white
V: (Light) pink
W: (Yellowish) white
Z: (Greenish) white
Y: (Bluish) white
a: Red-violet
b: White

DISPLAY

CROSS-REFERENCE TO RELATED PATENT APPLICATIONS

This application is a continuation application filed under 35 U.S.C. 111(a) claiming the benefit under 35 U.S.C. 120 and 365(c) of PCT International Application No. PCT/JP2014/001223, filed Mar. 5, 2014, which is based upon and claims priority to Japan Priority Application 2013-049426, filed Mar. 12, 2013 and Japan Priority Application 2013-118648, filed Jun. 5, 2013 and Japan Priority Application 2013-126655, filed Jun. 17, 2013, the entire contents of them all are hereby incorporated herein by reference.

BACKGROUND

The present invention relates to a display for preventing counterfeiting or copying of valuable stock certificates, such as gift tickets, or public documents, such as passports. The present invention further relates to a display which facilitates authenticity judgment with the naked eye and performs a function of preventing counterfeiting with high security, and to an information medium provided with the display.

A technique called watermarking is used for valuable stock certificates, such as paper currencies or gift tickets, or public documents, such as passports, for the purpose of preventing counterfeiting or imitation. Watermarking techniques have been known from long time ago as techniques for producing light and shade in an object. With this technique, when an object is observed by transmitting light therethrough, light and shade is produced with the change of intensity of the transmitted light so that one can confirm patterns, such as designs.

Methods of changing the intensity of transmitted light include, for example, a watermarking method in which the thickness of paper is slightly varied in fabricating the paper. These days as well, watermarking techniques are widely used as a means for preventing counterfeiting. However, the effects of preventing counterfeiting by these techniques are not sufficient because there is a risk that paper is patterned by means of oil or the like to create an imitation which can be perceived, at a glance, as a watermark. In such a situation, various techniques for preventing counterfeiting have been proposed, with which the effects can be confirmed by transmitting light through an object as is done with watermarks.

Further, as a display having visual effects that are different from those of a normal printed object, there is known a display that includes a diffraction grating which is formed by juxtaposing a plurality of grooves. For example, this display is able to display an image that changes in accord with observation conditions or is able to display a stereo mage. Iridescently shining spectral colors represented by the diffraction grating cannot be represented by a normal printing technique. For this reason, displays that include diffraction gratings are widely used for articles needing measures against counterfeiting.

PTL 1 proposes creating a pattern on a base, such as a colorless and transparent film with matte (rough) surface conditions, using a liquid material. The liquid material includes, for example, colorless and transparent acrylic lacquers that penetrate a rough surface and are dried. The patterned portions have light transmission properties greater than those in other portions to thereby provide a watermark pattern.

Further, in PTL 1, transparent thin films made of an inorganic compound are laminated to provide a multilayer interference film. When reflected light is observed from an interference film side, iridescently shining interference colors can be confirmed. Further, when transmitted light is observed from an opposite side of the interference film, complementary colors of specular reflection of the interference film side can be seen. Thus, a watermark pattern is permitted to coexist with flip-flop effects of the interference colors.

PTLs 2 and 4 propose a printed object obtained by printing a pattern with parallel lines on either one of the front and back of an object to be printed, and printing on the other side a pattern composed of streaks which are parallel lines applied with a design to be used as a latent image. When this printed object is seen by transmitting light therethrough, an image of a continuous tone can be confirmed, which appears as a result of merging of the patterns on the front and back.

PLTs 2 and 4 disclose a printed object in which a line pattern is printed on either of the front and back of an object through which light is transmitted. The other side of the printed object is printed with a pattern having a line array in synchrony with the line array of the line pattern on the one side and having approximately even streak widths perpendicular to the line array on the one side. The pitches of the line patterns on the front and back are changed by screen printing, while the front and back are aligned. Thus, the patterns on the front and back, as seen through transmitted light, are merged and the latent image appears as an image of a continuous tone.

PTL 3 proposes a printed object using watermarked paper having a concavo-convex configuration. The concavo-convex configuration is formed by a line pattern in which a design is represented by partially changing the angles of the lines, or a relief pattern, or by embossing the streak configuration of either of these patterns. In the watermarked paper, various line streaks with a predetermined interval therebetween are printed, with an inclination, onto portions other than the design portions having the concavo-convex configuration, using inks of colors excepting the color of the material and inks excepting transparent and colorless ink.

In the printed object of PTL 3, an irregular positional relationship is established between the concavo-convex configuration and the printed streaks having a predetermined interval therebetween. The irregular positional relationship exerts an effect of allowing one to recognize a specific letter, a motif, or the like as a latent image only when the printed object is seen from a specific angle. In addition, according to PTL 3, the watermarked paper exerts an effect of allowing one to easily recognize a watermark image through transmitted light.

PTL 5 describes that a plurality of diffraction gratings having grooves of different longitudinal directions or grating constants (i.e. pitch of grooves) are arranged to display a design. With the change of the position of an observer or a light source relative to the diffraction gratings, the wavelength of the diffracted light that reaches the observer's eye changes. Thus, using the above configuration, an iridescently changing image can be represented.

Image displays using diffraction gratings generally use relief-type diffraction gratings in which a plurality of grooves are formed. Usually, such a relief-type diffraction grating is obtained by manufacturing an original plate by photolithography and replicating the original plate.

However, lots of articles needing measures against counterfeiting come to use such an image display that includes a relief-type diffraction grating. As a result, this technique is now widely known. Along with this, there is a tendency that counterfeit articles are increasingly common. Therefore, it is now difficult to achieve sufficient effects of preventing counterfeiting using a display only characterized by iridescent light that is due to diffracted light.

PTL 6 discloses displaying a design with a combination of a diffraction grating pattern and a light scattering pattern. According to this, not only an iridescently changing image but also an image represented by light scattering can be displayed.

Further, PTL 7 describes a display that does not exert iridescent color change in accord with the change in position of a light or an observer, as is exerted by the relief-type diffraction grating pattern. Accordingly, visual effects different from those of the conventional diffraction grating are achieved.

PTLs 6 and 7 each describe a display that can exert visual effects greatly different from those of the iridescent color possessed by the conventional diffraction grating pattern. Accordingly, higher effects of preventing counterfeiting can be expected.

CITATION LIST

Patent Literature

PTL 1: JP-B-2840724
PLT 2: JP-B-H08-013568
PLT 3: JP-B-2615401
PLT 4: JP-B-2135101
PLT 5: U.S. Pat. No. 5,058,992
PLT 6: JP-B-2751721
PLT 7: JP-A-2011-118035

SUMMARY OF THE INVENTION

PTLs 1 to 4 set forth above each propose a technique such as a watermark with which the effects are recognized by transmitting light therethrough. In PTL 1, a watermark pattern is prepared in a simplified manner, followed by further adding an interference multilayer film to thereby obtain coloring effects caused by the interference of transmitted light. However, this is easily imitated by dropping a transparent resin onto a rough surface such as of a generally used diffusion film. Further, vapor deposition of a multilayer film involves complicated steps and thus takes time and effort.

Further, in PTLs 2 and 4, screen printing is performed on the front and back of a base after alignment, so that, when the transmitted light is observed, a grayscale image varied by the printing can be observed. However, correct alignment in performing printing on both surfaces incurs large equipment and cost. Further, the pattern that can be observed is limited to a grayscale image which is analogous to that of a normal watermark.

In PTL 3, offset printing is applied to an inclined surface of a concavo-convex structure. Accordingly, there is a necessity of inclining a base to perform printing and thus cumbersome steps are required to be taken. Further, performing printing onto an inclined base involves difficulty in controlling printing position, which raises a problem of productivity.

The displays described in PTLs 6 and 7 exert visual effects distinct from those of the conventional diffraction grating pattern, while they are both a kind of reflection-type image display. Reflection-type image displays are manufactured on the premise of providing display which is created by emission light as reflection of incident light, without taking account of observation through transmitted light.

A challenge of the present invention is to provide a display which is highly counterfeit resistant and has high aesthetic qualities. Another challenge of the present invention is to provide a display that can achieve coloring effects with various hues. Still another challenge of the present invention is to provide a display exerting special visual effects under both reflected light observation and transmitted light observation.

An example of a means for dealing with the challenges of the present invention is a display that includes a transparent base having one surface on which a structure-forming layer, a light reflection layer, and a protective layer are sequentially laminated, wherein: the light reflection layer reflects a part of light, while transmitting therethrough the rest of light; and the structure-forming layer includes a plurality of structure areas and each of the plurality of structure areas is formed of concavo-convex structures.

In this case, it is preferable that the plurality of structure areas are configured to be different from each other in respect of at least one selected from a group consisting of height, cycle, width of convexity, and width of concavity of the concavo-convex structure so that light transmitted through the plurality of structure areas have dominant wavelengths that are different from each other, and that the plurality of structure areas are each configured to display at least one item, as an image, selected from mutually different designs, letters, and numerals. Further, it is preferable that the concavo-convex structure has a longitudinal profile in a wind ripple pattern.

Further, it is preferable that the light reflection layer is a thin aluminum film formed by a vapor phase deposition method that is one selected from a group consisting of vacuum vapor deposition methods and sputtering methods. Further, it is preferable that light transmitted through the structure area has a dominant wavelength falling in a visible light range. In this case, the display may further include a transparent member, and the protective layer may have adhesiveness so that the protective layer can be joined to the light reflection layer and the transparent member.

In this case, the structure-forming layer may further include a non-structure area where no concavo-convex structure is formed, the structure area may have a transmittance exceeding 20%, and the non-structure area may have a transmittance of not more than 20%.

Further, at least one of the plurality of structure areas may include a plurality of concavo-convex structures having different heights. In this case, the concavo-convex structure is formed of two kinds of structures, one being a concavo-convex structure having a larger height, the other being a concavo-convex structure having a smaller height, and the concavo-convex structure having a larger height and the concavo-convex structure having a smaller height are alternately arranged. In this case, it is preferable that the concavo-convex structure has a maximum height of not less than 250 nm but not more than 600 nm. Alternatively, it is preferable that the concavo-convex structure has a minimum height of not less than 10 nm but not more than 200 nm. Further, it is preferable that the concavo-convex structure has a cycle of not less than 300 nm but not more than 800 nm. In this case, the plurality of structure areas may be equal in cycle and height of the concavo-convex structure, but may be different in width of concavity or width of convexity of the concavo-convex structure.

Further, the protective layer may have a surface on a side not contacting the reflection layer, this surface being provided with a transparent member having light scattering properties. Alternatively, the protective layer may have a surface on a side not contacting the light reflection layer, this surface being provided with a transparent member that is configured to be a concavo-convex structure so that at least a part of the transparent member has light scattering properties. Further, the transparent base may have a surface on a side not contacting the structure-forming layer, this surface being further provided with a concavo-convex structure to allow at least a part of the transparent member to have light scattering properties.

In this case, the concavo-convex structure may have a longitudinal profile in a wind ripple pattern. Further, the concavo-convex structure may be configured as a diffraction grating. Further, at least a part of the concavo-convex structure may be a linear structure. Further, the plurality of structure areas may be arranged in a matrix pattern. It is preferable that the light reflection layer is a thin aluminum film formed by a vapor phase deposition method that is one selected from a group consisting of vacuum vapor deposition methods and sputtering methods. Further, it is preferable that light transmitted through the structure area has a dominant wavelength that falls within a visible light range. Further, the display may further include a transparent member, and the protective layer may have adhesiveness so that the protective layer can be joined to the light reflection layer and the transparent member.

According to the present invention, a display which is more counterfeit resistant and can have higher aesthetic qualities can be provided. For example, coloring effects with a different hue can be achieved in the transmitted light in each structure area. For example, use of the nano-order fine structures can make it more difficult to perform organized counterfeiting that is to copy the concavo-convex structures.

The plurality of structure areas are each configured to display at least one item, as an image, selected from mutually different designs, letters, and numerals to enable various representations.

The light transmitted through the structure areas has dominant wavelengths falling within a visible light range (about not less than 380 nm but not more than 780 nm). Thus, a display that displays a watermark pattern exhibiting various colors can be provided.

The coloring effects of the transmitted light in the structure areas where the concavo-convex structures are formed exhibit a contrast to the non-structure areas where the transmitted light is not colored. Owing to the contrast, the coloring effects in the structure areas can be more emphasized.

The maximum height of the concavo-convex structures is not less than 250 nm but not more than 600 nm. Thus, the light which is incident on the structure areas is easily absorbed. In this way, the intensity of the light reflected from the structure areas is lowered, while part of light is observed as transmitted light, irrespective of the presence of the light reflection layer. Further, the maximum height of the concavo-convex structures is not less than 10 nm but not more than 200 nm. This contributes to preventing lowering of luminance of the reflected/diffracted light. Thus, when the reflection is observed as well, a highly luminous representation can be produced by the diffraction pattern. By combining the effects exerted under transmitted light observation with the effects exerted under reflected light observation, higher counterfeit resistance can be achieved.

The concavo-convex structures are permitted to have a cycle of not less than 300 nm but not more than 800 nm. Thus, the transmitted light can have dominant wavelengths that fall within a visible light range (about not less than 380 nm but not more than 780 nm). Accordingly, a display that enables observation of a watermark pattern exhibiting various colors can be provided.

In particular, the concavo-convex structures are permitted to have two kinds of structures, one being a structure of larger height, and the other being a structure of smaller height, and these structures are alternately arranged. This facilitates provision of a display that can produce both the color effects exerted under transmitted light observation and the luminance exerted under reflected light observation.

Further, a plurality of structure areas are provided and they are each arranged so as to show an image such as of a design, a letter, and a numeral, whereby various representations are available. Light with a different dominant wavelength is transmitted for each of the plurality of structure areas. Thus, coloring effects of the transmitted light can be achieved with a different hue in each structure area.

The structure areas having transmittance of not less 20% can provide a display exerting high visibility under transmitted light observation. Further, the structure areas are combined with non-structure areas having transmittance of not more than 20%. This allows the coloring effects of the transmitted light in the structure areas formed with the concavo-convex structures to exhibit contrast to the non-structure areas where the transmitted light is not colored. Thus, the coloring effects in the structure areas can be further emphasized.

DETAILED DESCRIPTION

With reference to the drawings, hereinafter is described a representative display of the present invention. The following various embodiments are preferred specific examples of the present invention. Further, components having functions identical with or similar to each other are given the same reference signs for the sake of omitting description.

Figure 1:
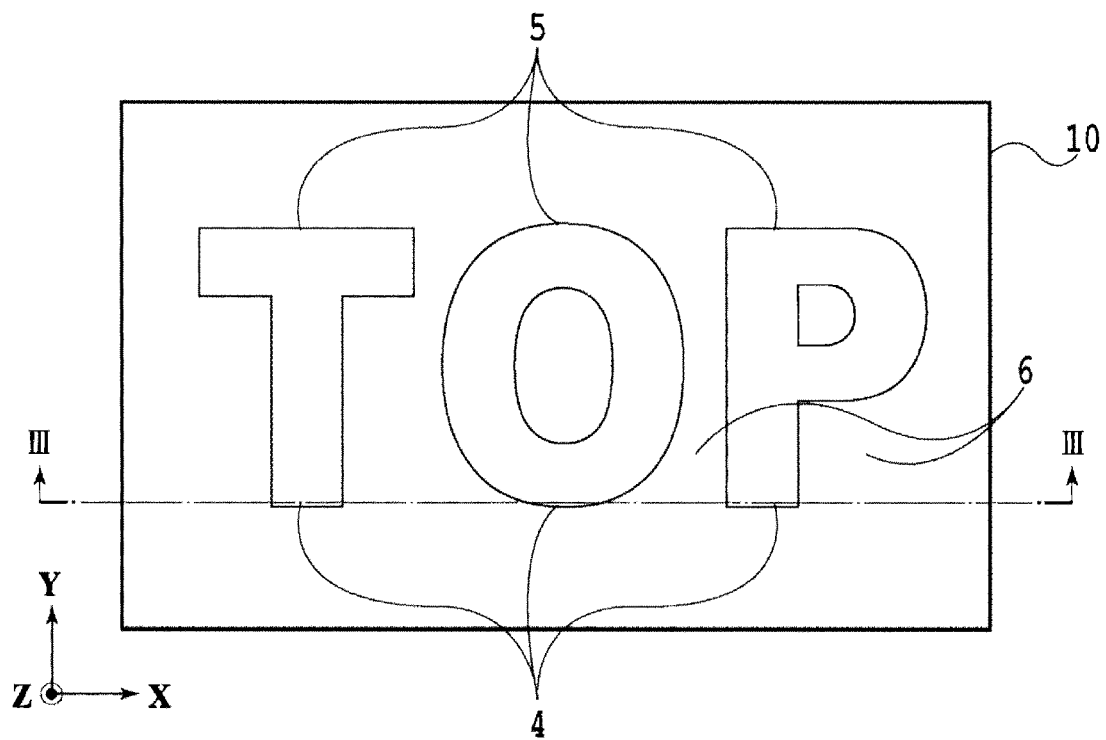
FIG. 1 is a schematic plan view illustrating an example of a display of the present invention.
Figure 2:
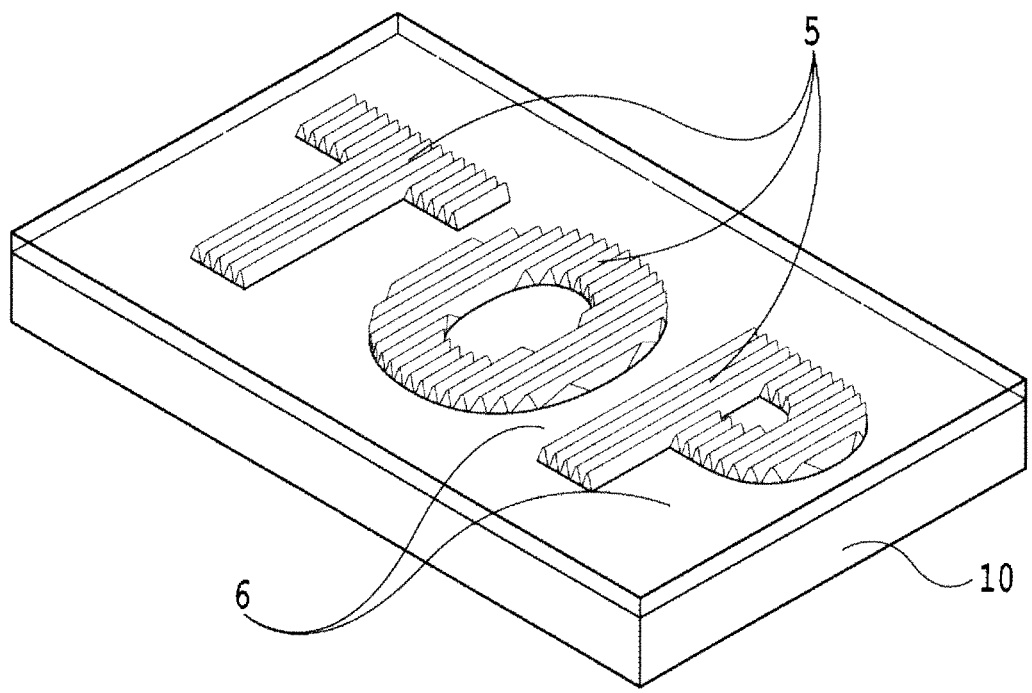
FIG. 2 is a schematic perspective view illustrating an example of the display of the present invention.
Figure 3:
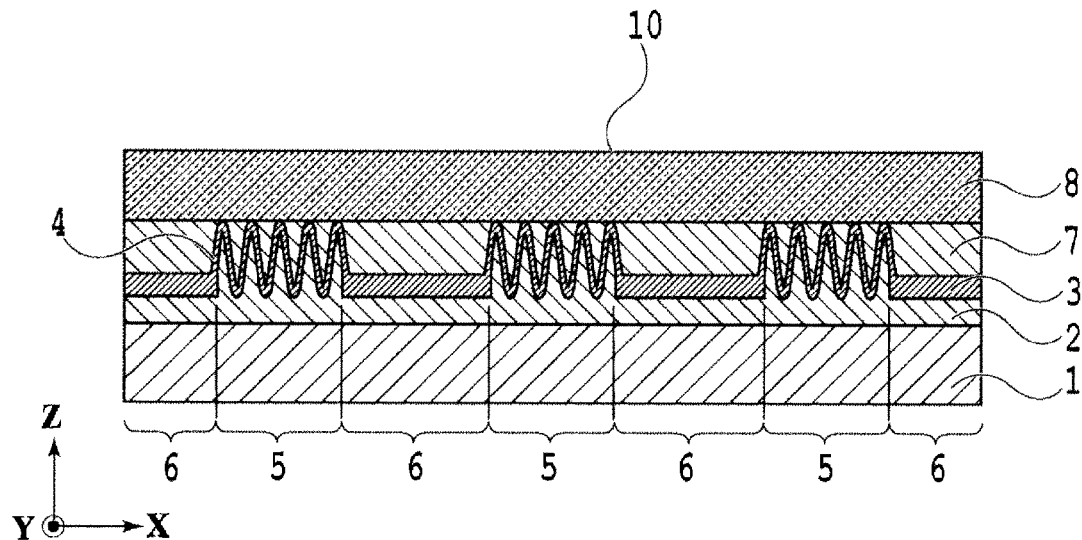
FIG. 3 is a vertical cross-sectional view taken along the line III-III of the display illustrated in FIG. 1.

FIGS. 1 to 3 schematically illustrate an example of the display of the present invention. A display 10 includes a transparent base 1 having one surface on which a structure-forming layer 2 is provided. The structure-forming layer 2 is configured by a structure area 5 where a concavo-convex structure 4 composed of a plurality of concavities and convexities is formed, and a non-structure area 6 where no concavo-convex structure 4 is formed. There may be provided several structure areas 5. In FIG. 1, the structure areas 5 are configured to display the letters "TOP" with the concavo-convex structures 4. The plurality of structure areas 5 can be configured to display at least one item, as an image, selected from mutually different designs, letters, and numerals. The structure-forming layer 2 has a surface which is not in contact with the transparent base 1 and is laminated thereon with a light reflection layer 3, a protective layer 7, and a transparent member 8 in this order.

Materials that can be preferably used as the transparent base 1 include resins, such as polyethylene terephthalate (PET), polycarbonate (PC), and triacetylcellulose (TAC), having sufficient light transmission properties and in the form of a film or sheet. Inorganic materials, such as glass, may also be used.

Materials that can be used as the structure-forming layer 2 include, for example, resins having transmission properties at visible light wavelengths. For example, as the resins that can be used, mention can be made of acryl, polycarbonate, epoxy, polyethylene, polypropylene, and the like, which have visible light transmission properties. Among them, use of thermoplastic resins or thermosetting resins enables easy preparation of the structure-forming layer 2 having any concavo-convex structures 4 on at least one surface of the transparent base 1, by performing transfer using an original plate in which the concavo-convex structures 4 are formed. Preferably, the concavo-convex structures 4 each have a longitudinal profile in a wind ripple pattern, more preferably, a sign wave pattern.

Figure 4:
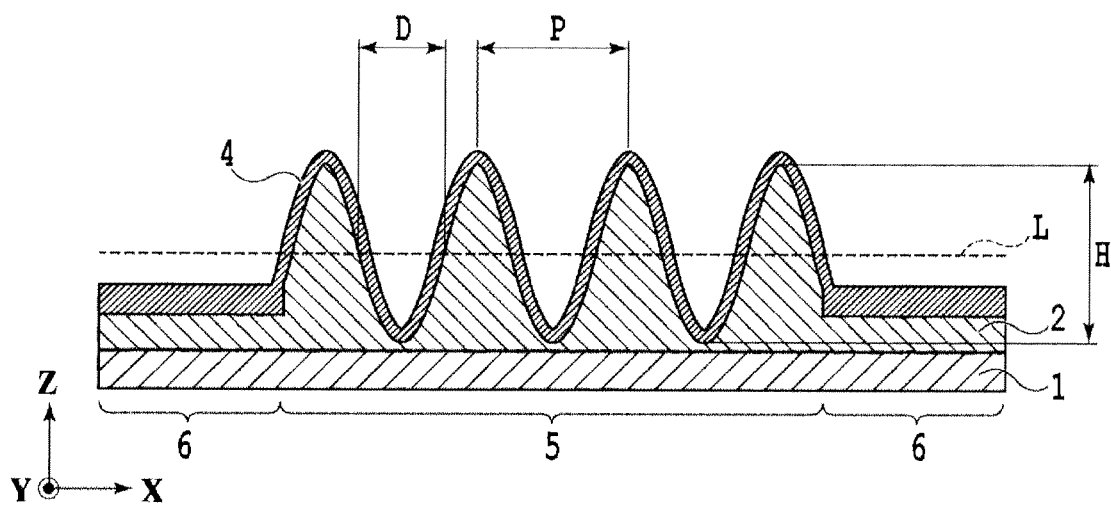
FIG. 4 is a vertical cross-sectional view schematically illustrating an example of a concavo-convex structure.

FIG. 4 schematically illustrates an example of a longitudinal profile of such a concavo-convex structure 4. In FIG. 4, the concavo-convex structure 4 has a height H which corresponds to a distance from the peak of each convexity to a lowest bottom line of each concavity of the concavo-convex structure 4. The concavo-convex structure 4 has a cycle P which corresponds to an interval between a convexity and the adjacent convexity, or an interval between a concavity and the adjacent concavity. In the concavo-convex structure 4 formed in each structure area 5, each concavity corresponds to a portion recessed toward the transparent base 1 from a center line L that divides the height H in half. In the concavo-convex structure 4 formed in each structure area 5, each convexity corresponds to a portion projected in a direction opposite to the transparent base 1 from the center line L that divides the height H in half.

The concavities and the convexities of the concavo-convex structure 4 each have a width as described below. When the width of concavity is expressed as being equal to the width of convexity, it means that, as shown in an example illustrated in FIG. 6 by (A), the concavity has a width D which is equal to a width D' of convexity. On the other hand, when the width of concavity is different from the width of convexity, it means that, as shown in an example illustrated in FIG. 6 by (B), the width D of concavity is larger than the width D' of convexity, or that, as shown in an example illustrated in FIG. 6 by (C), the width D of concavity is smaller than the width D' of convexity.

Figure 7:
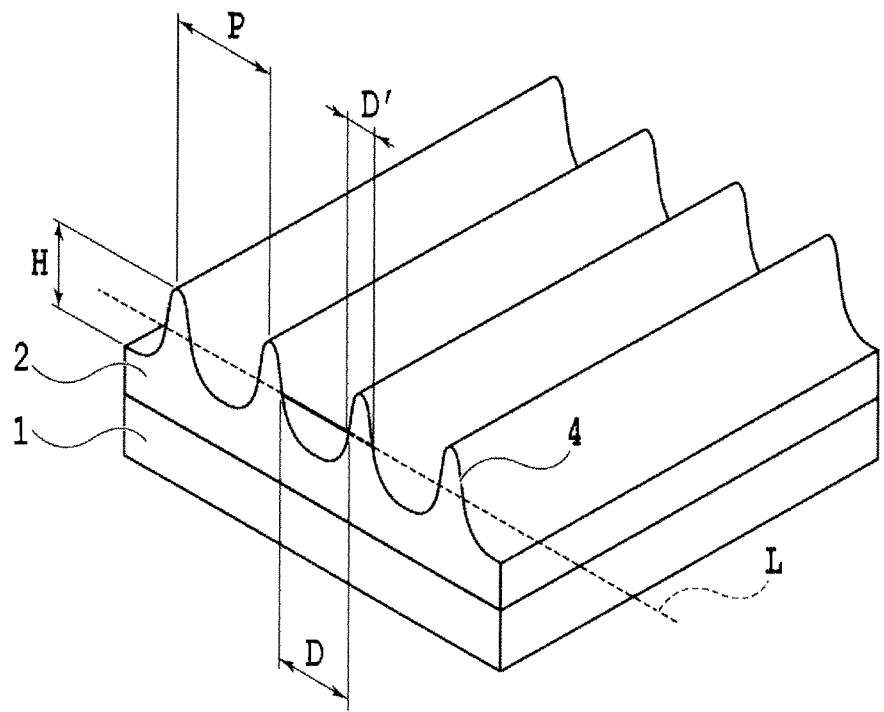
FIG. 7 is a schematic perspective view illustrating an example in which a concavo-convex structure is observed from an oblique direction.

FIG. 7 shows an example of a concavo-convex structure 4 in which the width D of concavity is larger than the width D' of convexity. In FIG. 7, the structure-forming layer 2 is formed on the transparent base 1, and the concavo-convex structure 4 is formed in the structure-forming layer 2.

The concavo-convex structure 4 having concavities and convexities of different widths D and D' corresponds to an example of the concavo-convex structure 4 having a longitudinal profile in a wind ripple pattern. It should be noted that a concavo-convex structure 4 in which the width D of concavity is equal to the width D' of convexity can be a further example of the concavo-convex structure 4 having a longitudinal profile in a wind ripple pattern or a sine wave pattern.

The light reflection layer 3 reflects a part of the light and transmits the rest of the light therethrough. The light reflection layer 3 enhances the reflectance at an interface of the structure-forming layer 2 in which the concavo-convex structures 4 are provided to contribute to allowing the transmitted light to exert coloring effects. The reflection layer 3 may be formed of a transparent coating or a metal coating.

When the light reflection layer 3 is formed of a transparent coating, it is preferable that the transparent coating has a refractive index which is different from that of the light transmissive structure-forming layer 2. The transparent coating can be formed of a dielectric layer, a dielectric multilayer film, or a material having high refractive index. Preferably, the transparent coating is formed of a material selected from a group consisting of ZnS, $TiO_2$, $PbTiO_2$, ZrO, ZnTe and $PbCrO_4$ having a refraction index of 2.0 or more. Preferably, the light transmissive structure-forming layer 2 and the transparent coating have a difference in refractive index of not less than 0.5. If the difference in refractive index is less than 0.5 between the light transmissive structure-forming layer 2 and the transparent coating, the visual effects of the emission light of the concavo-convex structures are diminished.

When the light reflection layer 3 is formed of a metal coating, the light reflection layer 3 can be formed of a material selected from a group consisting of chromium, nickel, aluminum, iron, titanium, silver, gold, copper, and a mixture of these materials, and an alloy of these materials. It should be noted that aluminum is preferable as a material of the light transmission layer 3. Methods of preparing the light reflection layer 3 using a metallic material include, for example, vapor phase deposition methods, such as a vacuum vapor deposition method or a sputtering method. Preferably, the light reflection layer 3 is a thin aluminum film. A thin aluminum film has an advantage of being available at lower cost compared such as to gold or silver. Further, it is known that aluminum facilitates high-accuracy film formation whichever of a vacuum vapor deposition method and a sputtering method is used. Aluminum also has an advantage of being easily handled in forming the light reflection layer 3.

The protective layer 7 is aimed to protect the concavo-convex structure 4 to prevent copying of the shape of the concavo-convex structure 4, or prevent imitation or counterfeiting of the display 10. As the protective layer 7, a transparent adhesive of heat-curing type or ultraviolet-curing type may also be used. For example, the protective layer 7 may be formed of a thermoplastic resin, such as a polypropylene resin, a polyethylene terephthalate resin, a polyacetal resin, and a polyester resin. In this case, the surface of the protective layer 7, which is not in contact with the light reflection layer 3, may further be adhered with the transparent member 8 to protect the display.

Similar to the transparent base 1, it is preferable that the transparent member 8 is a film or a sheet of a light transmissive resin, such as polyethylene terephthalate (PET), polycarbonate (PC), and triacetylcellulose (TAC), having light transmission properties. Further, inorganic materials, such as glass, may be used. The transparent member 8 is also able to prevent counterfeiting or imitation, that is, copying of the shape of the concavo-convex structure 4. The transparent member 8 may be provided for valuable stock certificates as well, such as gift tickets, passports, package members, or the like. In the present invention, the transparent member 8 is a preferable layer.

The following is a description of visual effects of the display 10.

Figure 8:
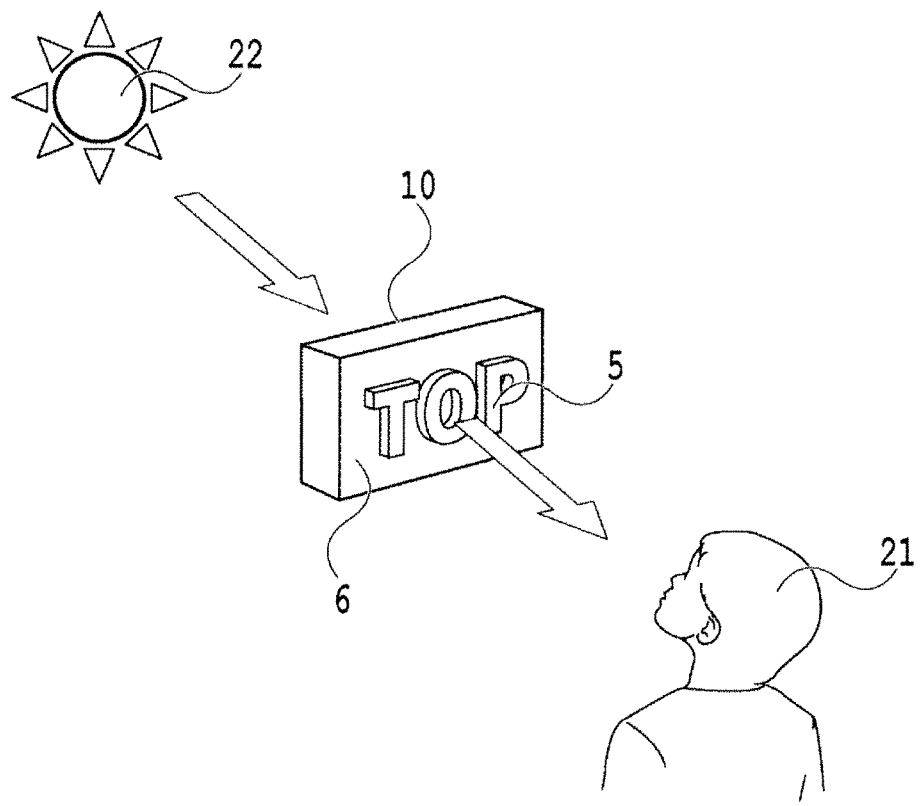
FIG. 8 is a diagram illustrating an example of a positional relationship in seeing light transmitting through the display.

FIG. 8 shows an example of a situation in which the display 10 is interposed between an observer 21 and a light source 22 and the observer observes transmitted light derived from the light source. In this situation, the light that has been transmitted through the structure areas 5 of the display 10 reaches the eye of the observer 21. The light transmitted through the display 10 has a wave front which is formed by superimposing the wave fronts of the light transmitted after even-number repetitions of reflection inside the display 10. When there is no phase difference between the wave fronts, a maximum intensity is obtained in the transmitted light. The optical path length in this case is an integral multiple of the wavelength, establishing the following Formula (1):

$$m\lambda = 2 \times TO \times \cos\theta \quad (1)$$

where m represents a diffraction order, and TO represents an optical path length. TO is set taking account of a refractive index of a medium in which light propagates, in addition to a physical distance. When the display 10 has a thickness D and a refractive index n, TO=nD is satisfied.

In this case, wavelengths other than a specific wavelength cause interference, cancelling with each other at the wave fronts, and thus are hardly transmitted to the surface on the opposite side of the light source 22. This means that the wavelength of the light transmitted to the surface on the opposite side of the light source can be controlled by controlling the optical path length of the thin film.

By varying the height H, the cycle P, the width D of concavity, or the width D' of convexity of the concavo-concave structure 4, the optical path length can be varied relative to the light that is incident on the structure-forming layer 2 and the light reflection layer 3. Therefore, incident light from a specific angle can be emitted, as transmitted light having a specific wavelength, to the surface on the opposite side of the light source. This enables observation of a color watermark pattern which is different, for example, from a conventional watermark pattern with monochrome gradation.

The following description deals with the case where the height H of the concavo-convex structure 4 is varied. Variation in the height H of the concavo-convex structure 4 provided in the structure area 5 varies the optical path length TO. For example, as the height H of the concavo-convex structure 4 becomes higher (larger), the light which is incident on the structure area 5 can be more easily absorbed. In this case, the intensity of the light reflected from the structure area 5 is lowered. Since the intensity and lightness of the light reflected from the structure area 5 are low when the reflected light is observed, the area is visually recognized as an area exhibiting colors from dark gray to black.

On the other hand, for example, as the height H of the concavo-convex structure 4 becomes lower (smaller), the incident light is unlikely to be absorbed. Therefore, the intensity of the light reflected from the structure area 5 is increased. Since the intensity and lightness of the light reflected from the structure area 5 are high when the reflected light is observed, the area is visually recognized as an area exhibiting colors from light gray to gray.

Further, it has been discovered that, when the light transmitted through the structure area 5 is observed under the condition where the height H of the concavo-convex structure 4 is small, the structure area 5 exhibits colors from violet-blue to blue. This is based on the action of transmission of light having a dominant wavelength in a short wavelength range (of about 380 nm to 480 nm).

Further, it has been discovered that, when the light transmitted through the structure area 5 is observed under the condition where the height H of the concavo-convex structure 4 is large, the structure area 5 exhibits a color of yellow to red. This is based on the action of transmission of light having a dominant wavelength in a long wavelength range (of about 580 nm to 680 nm).

Figure 5:
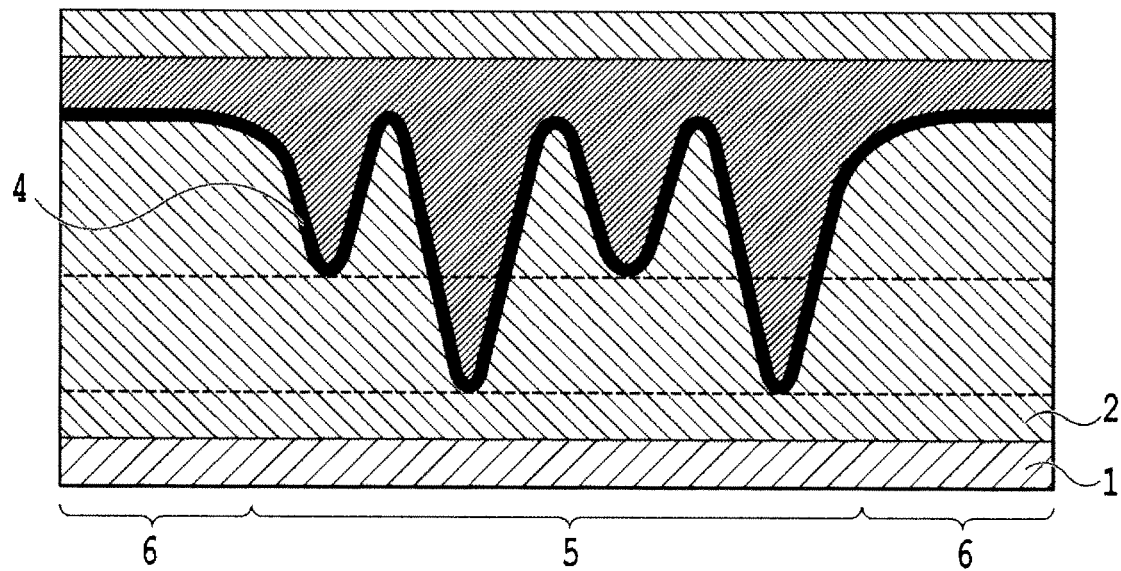
FIG. 5 is a vertical cross-sectional view schematically illustrating an example of another concavo-convex structure.

FIG. 5 schematically illustrates another example of a longitudinal profile of the concavo-convex structure 4. When there is a change in the height of the concavo-convex structure 4 provided to the structure area 5, there is a change in the optical path length TO. When the concavo-convex structures 4 with a height of not less than 250 nm alone are provided, the light that is incident on the structure areas 5 comes to be more easily absorbed and therefore the intensity of the light reflected from the structure areas 5 is lowered. In this case, when the light reflected from the structure areas 5 is observed, the lightness becomes lower because the intensity of the reflected light is lower. Under the conditions where no diffracted light is observed, the areas are visually recognized as areas exhibiting colors from dark gray to black. However, under the conditions where diffracted light is observed as well, the luminance becomes lower.

On the other hand, when the concavo-convex structures 4 with the height H of not more than 200 nm alone are provided, incident light is unlikely to be absorbed and therefore the intensity of the light reflected from the structure areas 5 increases. In this case, when the light reflected from the structure areas 5 is observed, the lightness becomes high because the intensity of the reflected light is high. Under the conditions where no diffracted light is observed, the areas are visually recognized as areas exhibiting colors from light gray to gray. However, under the conditions where diffracted light is observed, the luminance becomes higher.

Further, when transmitted light is observed in the case of the concavo-convex structures 4 with a height of not more than 200 nm, transmitted light is hardly observed due to the light reflection layer 3. In contrast, with the concavo-convex structures 4 having a height of 250 nm to 600 nm, part of light is transmitted and observed, irrespective of the presence of the light reflection layer 3.

As shown in FIG. 5, provision of a plurality of concavo-convex structures 4 with different heights in a single structure area 5 enables preparation of a display which exerts higher effects under transmitted light observation and also exerts higher effects in the diffracted light under reflected light observation.

Further, when a plurality of structure areas 5 are configured so as to be different in the height of the concavo-convex structure 4, light whose dominant wavelength is different for each of the plurality of structure areas 5 is ensured to be transmitted. This enables preparation of a display which exhibits a plurality of colors when the transmitted light is observed.

Figure 9:
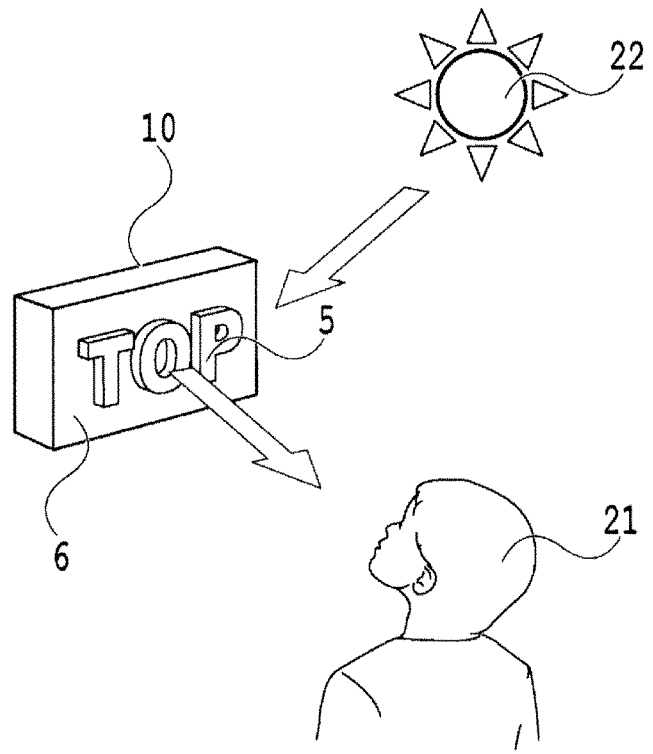
FIG. 9 is a diagram illustrating an example of a positional relationship in seeing light reflected by the display.

There are other visual effects of the display, which are exerted when the diffracted light of the display 10 is observed. FIG. 9 illustrates an example in which the observer 21 observes the light derived from the light source 22 and reflected by the display 10. The concavo-convex structure 4 may be applied with a structure similar to a diffraction grating having longitudinal profile in a sine wave pattern. In such a case, the diffracted light can be observed according to the following Formula (2).

Figure 10:
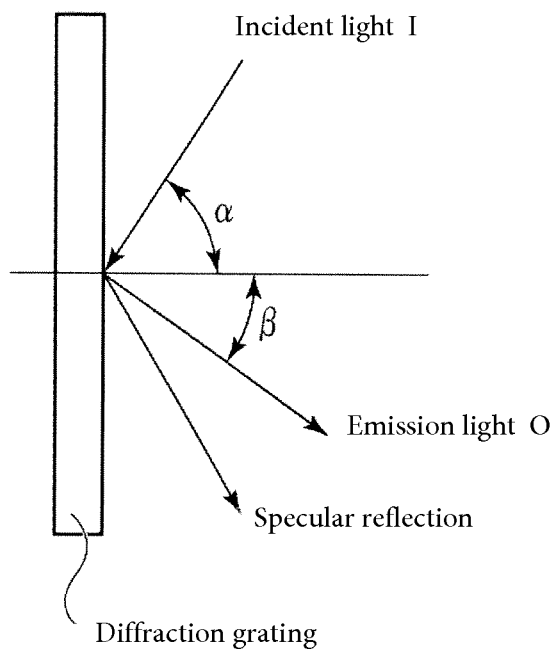
FIG. 10 is a diagram illustrating an example of a positional relationship between light incident on a diffraction grating, reflected light, and diffracted light.

FIG. 10 shows a positional relationship between light incident on a diffraction grating (incident light I) and light emitted from the diffraction grating (emission light O). When P represents a cycle of the diffraction grating, λ represents a wavelength of the incident light I, m represents a diffraction order, α represents an incident angle relative to the structure, and β represents an incident angle of $m^{th}$ diffracted light, a relationship therebetween is calculated from (Formula 2):

$$P(\sin \alpha - \sin \beta) = m\lambda \quad (2)$$

When the light reflected from the display 10 is observed, diffracted light of a specific wavelength λ can be observed in a range calculated from Formula (2). It will be understood from Formula (2) that the wavelength of the diffracted light varies by inclining the display 10 or varying the observation angle. As a result, when the reflected/diffracted light is observed, iridescently shining effects can be achieved in the structure areas 5.

As described above, when the light transmitted through the structure areas 5 of the display 10 is observed, the light of a specific wavelength can be observed as a watermark pattern. Further, when the light reflected from the structure areas 5 of the display 10 is observed, diffracted light can be visually recognized in a characteristic range, and when the display 10 is inclined or the observation angle is varied, iridescently shining effects can be achieved in the diffracted light.

The following description deals with the case where the cycle P of the concavo-convex structure 4 is varied. When the light transmitted through the structure area 5 is observed in the case where the cycle P of the concavo-convex structure 4 provided to the structure area 5 is short, it was found that the structure area 5 exhibited colors from violet-blue to blue. This is based on the action of transmission of light having a dominant wavelength in a short wavelength range (of about 380 nm to 480 nm).

Further, when the light transmitted through the structure area 5 is observed in the case where the cycle P of the concavo-convex structure 4 provided to the structure area 5 is long, it was found that the structure area 5 exhibited colors from yellow to red. This is based on the action of transmission of light having a dominant wavelength in a long wavelength range (of about 580 nm to 680 nm). In this way, varying the cycle P of the concavo-convex structure 4, the dominant wavelength of light transmitting through the structure area 5 can be varied.

Ensuring that the concavo-convex structure 4 has a different cycle P in each structure area 5, dominant wavelengths of the light transmitted through the respective structure areas are ensured to be varied. This enables preparation of the display 10 which exhibits a plurality of colors when the transmitted light is observed.

The following description deals with the case of varying the width D of concavity and the width D' of convexity of the concavo-convex structure 4. It was found that, varying the widths of concavity and convexity of the concavo-convex structure 4, transmitted light produced an action of shifting the dominant wavelength. When the widths of concavity and convexity of the concavo-convex structure 4 are equal (an example is shown in FIG. 6 by (A)), the light transmitted through the structure area 5 has a dominant wavelength that is optionally determined, as mentioned above, in accord with the height H and the cycle P of the concavo-convex structure 4.

Figure 6:
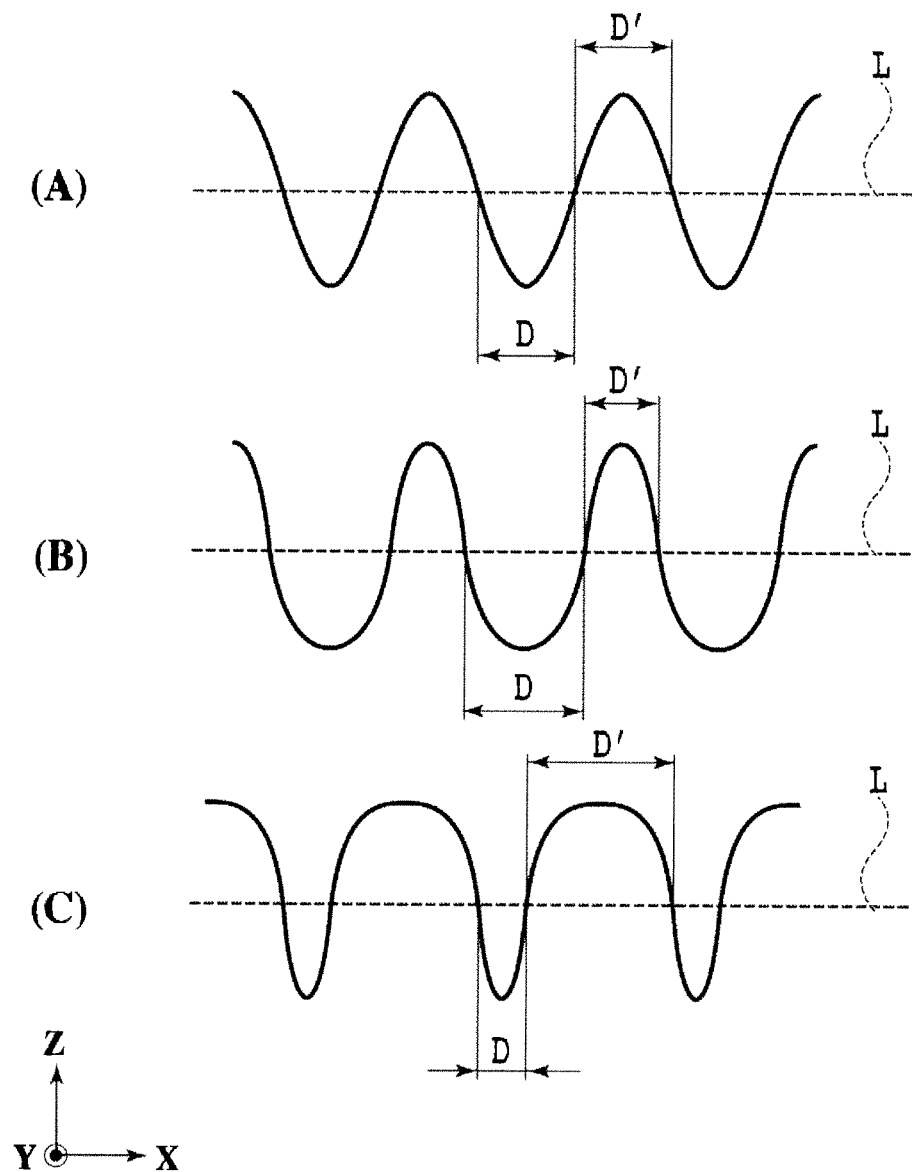
FIG. 6 shows diagrams schematically illustrating examples of width of concavity and width of convexity.

In this regard, when the concavity of the concavo-convex structure 4 is made larger (an example is shown in FIG. 6 by (B)), the light transmitted through the structure area 5 has a dominant wavelength which shifts counterclockwise on a chromaticity chart, compared to the case where the widths of concavity and convexity of the concavo-convex structure 4 are equal.

In contrast, when the concavity of the concavo-convex structure 4 is made smaller (an example is shown in FIG. 6 by (C)), the light transmitted through the structure area 5 has a dominant wavelength which shifts clockwise on a chromaticity chart, compared to the case where the widths of concavity and convexity of the concavo-convex structure 4 are equal.

Figure 11:
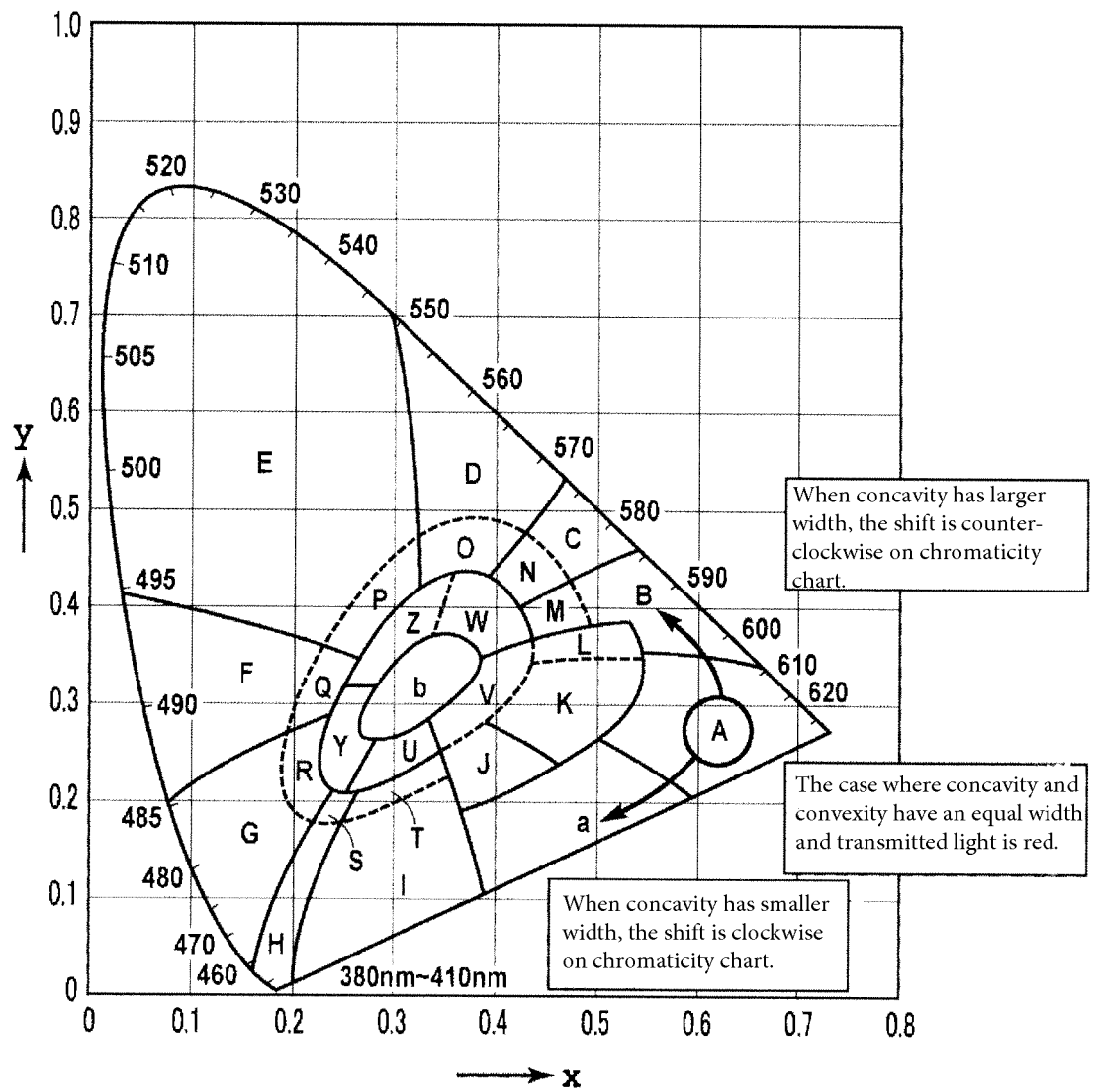
FIG. 11 is a diagram illustrating an example of a wavelength shift on an xy chromaticity chart.

The direction of shift of the wavelength mentioned above implies the direction of variation of hue on the chromaticity chart shown in FIG. 11. As shown in FIG. 11, for example, the case is shown where the widths of concavity and convexity are equal in the concavo-convex structure 4 having predetermined cycle P and height H, and the transmitted light has a dominant wavelength exhibiting red color.

In this case, when the width of concavity is made larger and that of convexity is made smaller in the concavo-convex structure 4 having the predetermined cycle P and height H (an example is shown in FIG. 6 by (B)), the transmitted light has a dominant wavelength which shifts counterclockwise on the chromaticity chart to exhibit colors from yellow-red to yellow.

In contrast, when the width of concavity is made smaller and that of convexity is made larger in the concavo-convex structure 4 having the predetermined cycle P and height H (an example is shown in FIG. 6 by (C)), the transmitted light has a dominant wavelength which shifts clockwise on the chromaticity chart to exhibit colors from red-violet to violet.

As described above, varying the widths of concavity and convexity of the concavo-convex structure 4, transmitted light produces an action of shifting the dominant wavelength. In this case, the reflection/diffraction angle and the reflection/diffraction wavelength hardly vary, irrespective of the change in the widths of concavity and convexity of the concavo-convex structure 4. Therefore, in a range where diffracted light or diffracted light can be observed, light having substantially the same wavelength can be observed as reflected/diffracted light, as far as the cycle P remains unchanged.

Whichever of the relationships may be established between the widths of concavity and convexity, coloring effects of the transmitted light are expected to be exerted, as far as the cycle P is not less than 300 nm but not more than 800 nm and the height H is not less than 100 nm but not more than 600 nm. In this case, it is preferable that the concavo-convex structure 4 has a longitudinal profile in a wind ripple pattern.

Let us take an example where a plurality of structure areas 5 are provided, with the cycle P and the height H being fixed but with the width of concavity or convexity alone being different. In this case, the display 10 that can be prepared enables visual recognition of the areas as exhibiting substantially an unchanged hue through the observation of the reflected light but exhibiting different hues through the observation of the transmitted light.

The following Table 1 summarizes the actions occurring in reflected light and transmitted light with the variation of the cycle P, the height H and the widths of concavity and convexity of the concavo-convex structure.

TABLE 1

| Parameter | | Dominant action on transmitted light | Dominant action on reflected light |
| --- | --- | --- | --- |
| Height H | Low | Transmitted light has a dominant wavelength in short wavelength range. | Intensity of reflected light is increased. |
| | High | Transmitted light has a dominant wavelength in long wavelength range. | Intensity of reflected light is decreased. |
| Cycle P | Short | Transmitted light has a dominant wavelength in short wavelength range. | Diffraction angle becomes larger. Diffraction wavelength shifts to short wavelength range. |
| | Long | Transmitted light has a dominant wavelength in long wavelength range. | Diffraction angle becomes smaller. Diffraction wavelength shifts to long wavelength range. |
| Widths of concavity and convexity | Concavity has a large width. (Convexity has a small width.) | Transmitted light has a dominant wavelength shifting counterclockwise on chromaticity chart. | Diffracted light is emitted in accord with the cycle P. |
| | Concavity and convexity have an equal width. | Light of any dominant wavelength is transmitted in accord with the depth H and frequency P. | Diffracted light is emitted in accord with the cycle P. |
| | Concavity has a small width. (Convexity has a large width.) | Transmitted light has a dominant wavelength shifting counterclockwise on chromaticity chart. | Diffracted light is emitted in accord with the cycle P. |

When the height H is decreased (made smaller) (e.g., about 100 nm), the wavelength of the transmitted light falls in a short wavelength range, while transmitted-light intensity is increased in the reflected light.

On the other hand, when the height H is increased (made larger) (e.g., about 500 nm), the wavelength of the transmitted light falls in a long wavelength range, and exhibits a behavior of making a circuit on the chromaticity chart, from the short wavelength range to the long wavelength range. Further, the reflected light brings about an action, for example, of increasing the diffraction angle and allowing the diffraction wavelength to shift to the short wavelength range.

When the cycle P is shortened (e.g., about 300 nm), the wavelength of the transmitted light falls in a short wavelength range, while transmitted-light intensity is increased in the reflected light.

On the other hand, when the cycle P is lengthened (e.g., about 800 nm), the wavelength of the transmitted light falls in a long wavelength range, and exhibits a behavior of making a circuit on the chromaticity chart, from the short wavelength range to the long wavelength range. Further, the reflected light brings about an action, for example, of decreasing the diffraction angle and allowing the diffraction wavelength to shift to the long wavelength range.

When the width of concavity is broadened (width of convexity is narrowed), the wavelength of the transmitted light shifts counterclockwise on the chromaticity chart, comparing to the case where the widths of concavity and convexity are equal.

On the other hand, when the width of concavity is narrowed (width of convexity is broadened), the wavelength of the transmitted light shifts clockwise on the chromaticity chart, comparing to the case where the widths of concavity and convexity are equal.

As a dominant action on the reflected light, diffracted light is emitted in accord with the cycle P, and the diffraction angle or the diffraction wavelength remains substantially constant in any of the cases where the widths of concavity and convexity are equal, where the width of concavity is larger (width of convexity is smaller), and where the width of concavity is smaller (width of convexity is larger).

The display 10 has a plurality of structure areas 5 and the plurality of structure areas 5 are arranged so as to display respective images, such as designs, letters or numerals. In such an arrangement, the plurality of structure areas 5 can each be ensured to have a difference in at least one selected from a group consisting of the height, cycle, width of convexity, and width of concavity of the concavo-convex structure 4. In this way, the wavelengths (hues) of the transmitted light observed from the structure areas 5 can be made different from each other. Instead of the simple grayscale image that is the effect of the conventional watermark, a plurality of color images can be observed as a watermark image.

Figure 12:
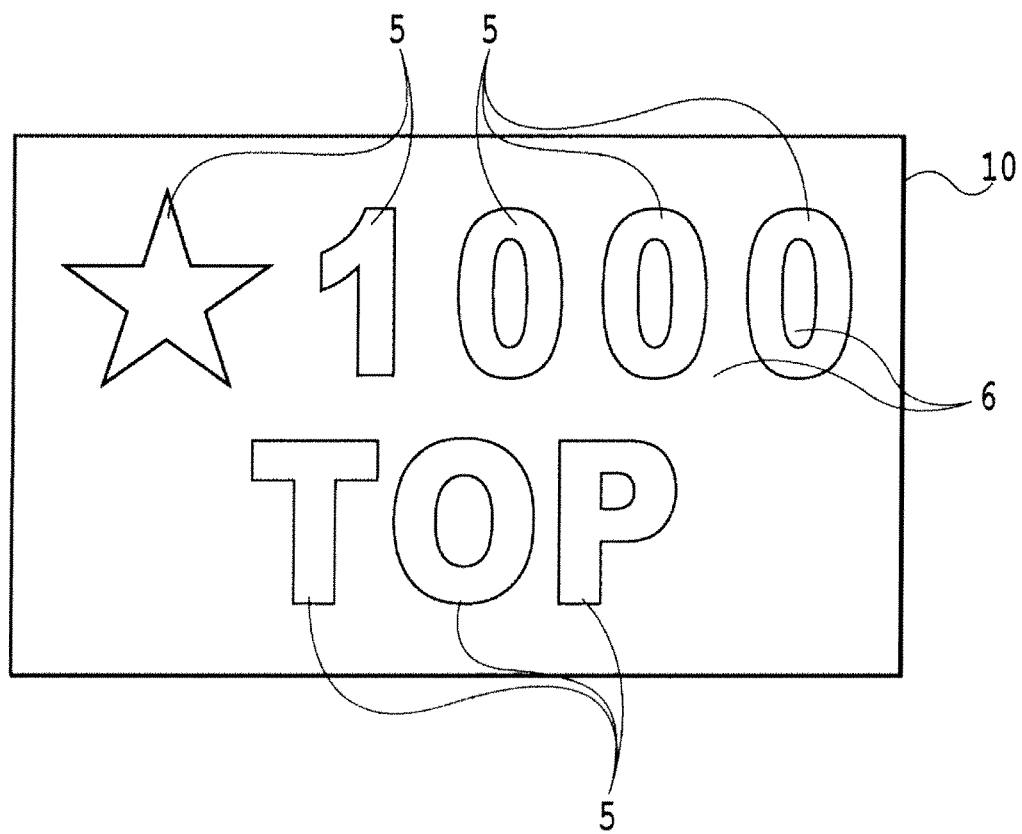
FIG. 12 is a schematic plan view illustrating still another example of the display of the present invention.

FIG. 12 shows an example of the display 10 having a plurality of structure areas 5. In the example shown in FIG. 12, each of the design indicating a star, the numerals indicating "1000", and the letters indicating "TOP" is formed of the structure areas 5. Areas other than the structure areas 5 are configured by non-structure areas 6 where no concavo-convex structure 4 is formed.

In this example, the dominant wavelengths transmitted through the structure areas 5 that display the respective design, numerals and letters are permitted to be different from each other. For example, the concave-convex structure 4 of each structure area 5 configuring the design of the star uses the structure of an example shown in FIG. 6 by (B) with a cross-sectional profile in which the width D of concavity is larger than the width D' of convexity.

Further, the concave-convex structure 4 of each structure area 5 configuring the numerals "1000" uses the structure of an example shown in FIG. 6 by (A) with a cross-sectional profile in which the width D' of convexity is equal to the width D of concavity.

Further, the concave-convex structure 4 of each structure area 5 configuring the letters "TOP" uses the structure of an example shown in FIG. 6 by (C) with a cross-sectional profile in which the width D of concavity is smaller than the width D' of convexity.

Thus, the display 10 prepared as described above enables one to visually recognize, for example, the light transmitted through the star design portion as being green, the light transmitted through the numerals "1000" as being yellow, and the light transmitted the letters "TOP" as being red.

If the non-structure areas 6 have a light transmittance of not more than 20%, the observer can visually recognize the non-structure areas 6 as exhibiting colors of gray to black, through the observation of the light transmitted through the non-structure areas 6. In this case, a contrast can be made with the colored light transmitted through the structure areas 5. Thus, the coloring effects of the transmitted light in the structure areas 5 can be more effectively used.

The light transmittance of the non-structure areas 6 can be controlled by the thickness of the light reflection layer 3 formed on the surface of the structure-forming layer 2 which is not in contact with the transparent base 1. This will be described below.

Figure 13:
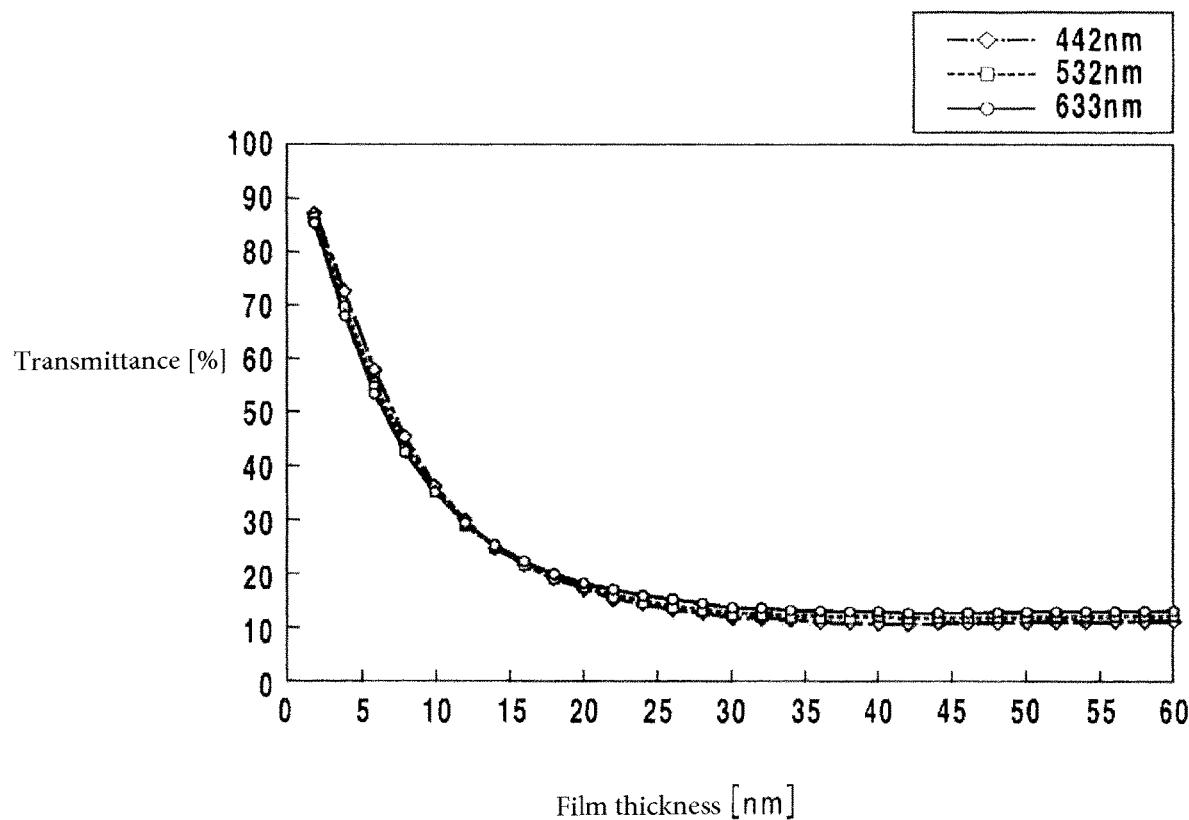
FIG. 13 is a diagram illustrating a relationship between thickness and transmittance of a metal layer.

Let us discuss the case where a thin aluminum film is used as a material of the light reflection layer 3. FIG. 13 is a graph showing dependence of transmittance on thickness for wavelengths 442 nm, 532 nm, and 633 nm, in the case where the thin aluminum film is formed on the structure-forming layer 2 (having a refractive index of 1.5).

Referring to FIG. 13, when the thin aluminum film has a thickness of not less than 20 nm, the wavelengths 442 nm, 532 nm and 633 nm each shows a transmittance of not more than 20%. As mentioned above, when the light transmittance of the non-structure areas 6 is not more than 20%, the observer can visually recognize the non-structure areas 6 as exhibiting colors of gray to black, through the observation of the light transmitted through the non-structure areas 6. In this case, the coloring effects on the transmitted light in the structure areas 5 can be more effectively used. Accordingly, it is preferable that the thin aluminum film as the light reflection layer 3 arranged on the non-structure areas 6 has a thickness of not less than 20 nm.

Figure 14:
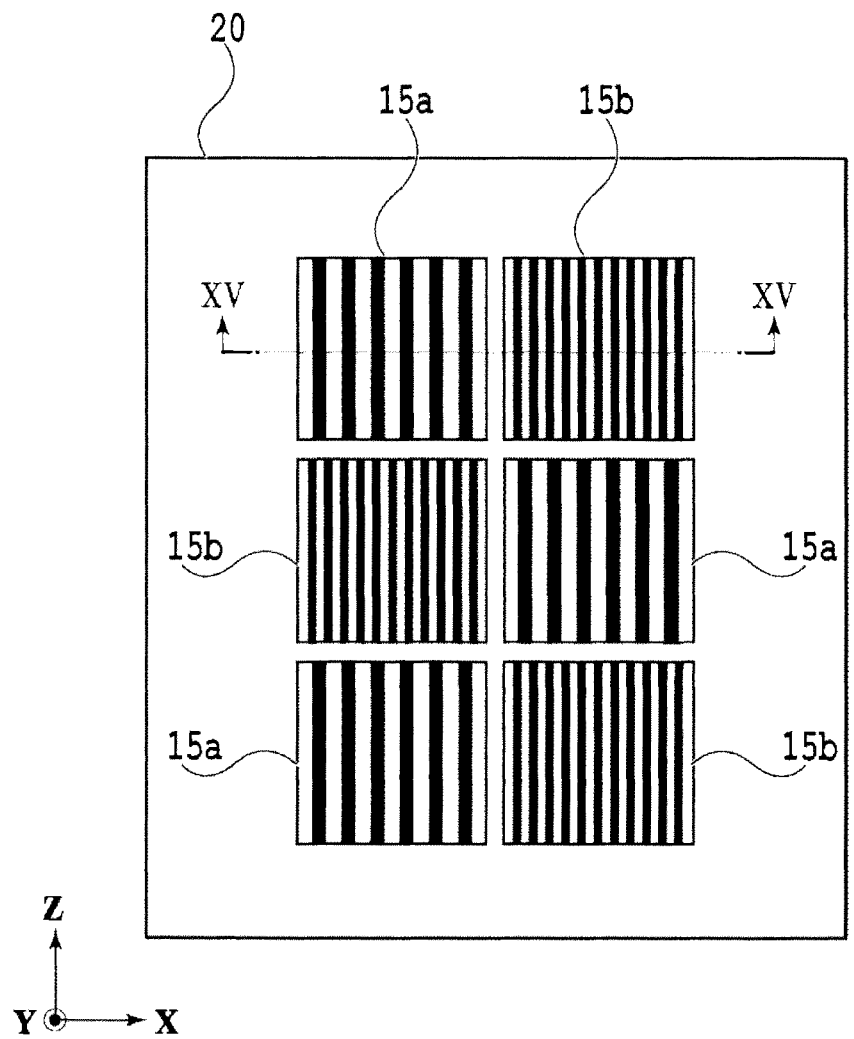
FIG. 14 is a schematic plan view illustrating still another example of the display of the present invention.
Figure 15:
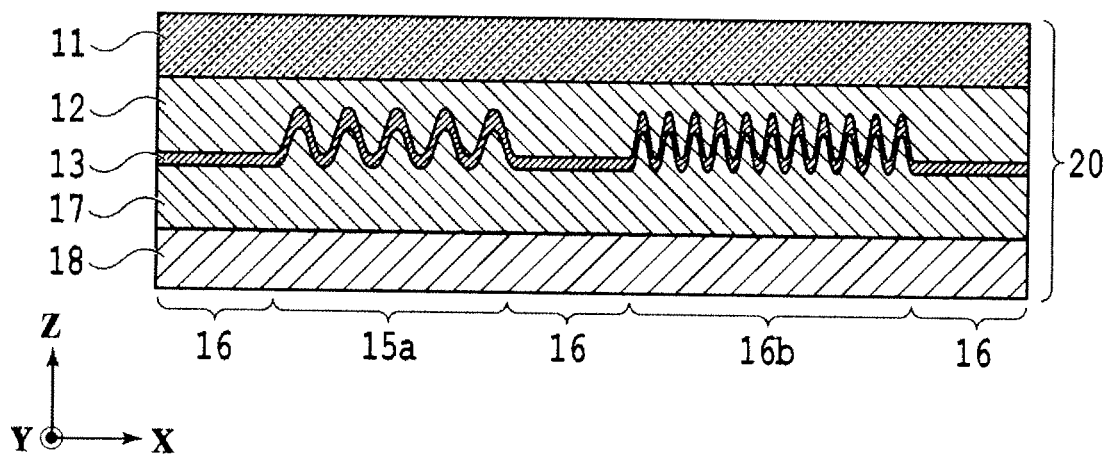
FIG. 15 is a vertical cross-sectional view taken along the line XV-XV of FIG. 14

FIGS. 14 and 15 schematically illustrate another example of the display of the present invention. A display 20 shown in FIGS. 14 and 15 is configured by laminating a light transmissive structure-forming layer 12, a light reflection layer 13, a protective layer 17 having adhesiveness, and a transparent member 18, in this order, on one surface of a transparent base 11. The structure-forming layer 12 includes a plurality of structure areas 15a and 15b, and non-structure areas 16.

The transparent base 11, the light transmissive structure-forming layer 12, the light reflection layer 13, and the protective layer 17 having adhesiveness may use materials which are the same as those used for the transparent base 1, the structure-forming layer 2, the light transmission layer 3, and the protective layer 7, respectively, described above.

The structure-forming layer 12 includes the plurality of structure areas 15a and 15b, and the non-structure areas 16. Although the structure-forming layer 12 includes three structure areas 15a and three structure areas 15b, only two or more of the structure areas may be provided, the number not being limited to six. Further, although the structure areas 15a and 15b are arranged in a checkered pattern, the arrangement of the structure areas is not limited to this.

When the observer 21 observes the display 10 in a situation as shown in FIG. 8 or 9, the range where transmitted light 24 according to Formula (1) can be observed unavoidably relies on the size of the light source 22. For example, in the case where the light source 22 is a very small point light source, the range where the observer 21 can observe the transmitted light 24 being transmitted through the image display 10 corresponds to only a very small point in accord with the size of the light source 22.

Specifically, in order that the observer 21 observes the entire image that can be observed with the transmitted light displayed on the display 10, a light source 22 in conformity with the size of the image is needed. In other words, without an appropriate light source 22, it is difficult to observe the entire image at a time which can be observed with the transmitted light displayed in the display 10. It may sound a little drastic, it becomes necessary to use a tool, such as a light table, which is able to apply incident light to the entire image display section of the display 10.

In this example, at least a part of the transparent member 18 has light scattering properties. The light which is incident on the transparent member 18 is scattered in the transparent member 18. In this case, the wave front of the transmitted light is formed as a result of repeating reflection by an even number of times in the display 20, followed by superimposing the plurality of wave fronts of the transmitted light. Therefore, the problem mentioned above, i.e. the observer 21's observable region relying on the size of the light source 22, is not caused. Thus, an image can be displayed without relying on the lighting environment, such as the position, size, and the like, of the light source.

Further, in still another example of the display of the present invention, at least one of the transparent base 11, the structure-forming layer 12, and the protective layer 17 having adhesiveness has light scattering properties. In this case as well, a colored watermark image can be observed without relying on the lighting environment, such as the position, size, and the like of the light source 22.

Further, at least one selected from a group consisting of the height of concavo-convex structure, cycle thereof, width of concavity, and width of convexity is made different between the plurality of structure areas to permit the concavo-convex structures to have different shapes. In this case, taking the individual structure areas as pixels, transmitted light of various colors can be emitted from the respective structure areas. This enables display of an image in vivid colors, with a plurality of colors being shown on a single plane.

It should be noted that the concavities or convexities of the concavo-convex structure may be linearly structured, or furthermore, may be provided in the form of a diffraction grating.

When the illumination light used for observation is white light containing a plurality of wavelength components, the emission angle of the diffracted light depends on the wavelengths. In a diffraction grating, when it is observed under a white illumination light source, such as the sun or a fluorescent light, the white light is dispersed and the light beams, each having its own wavelength, are emitted at respective angles and appear to be iridescently changing, depending on the angle of observation.

For example, the concavo-convex structures in the plurality of structure areas may be ensured to have the same cycle but different depths or heights. In this case, when observed from the transmitted light side (protective layer side), the transmitted light can be observed as having different colors. On the other hand, when observed from an incident light side (transparent member side), the reflected light (diffracted light) is observed as being of uniform color. This is because, as mentioned above, the wavelength of the emission light (diffracted light) emitted from the diffraction grating is determined by the grating constant of the diffraction grating as calculated from Formula (2). This enables provision of a display with which an observed image is different between transmitted light observation and reflected light observation.

Figure 16:
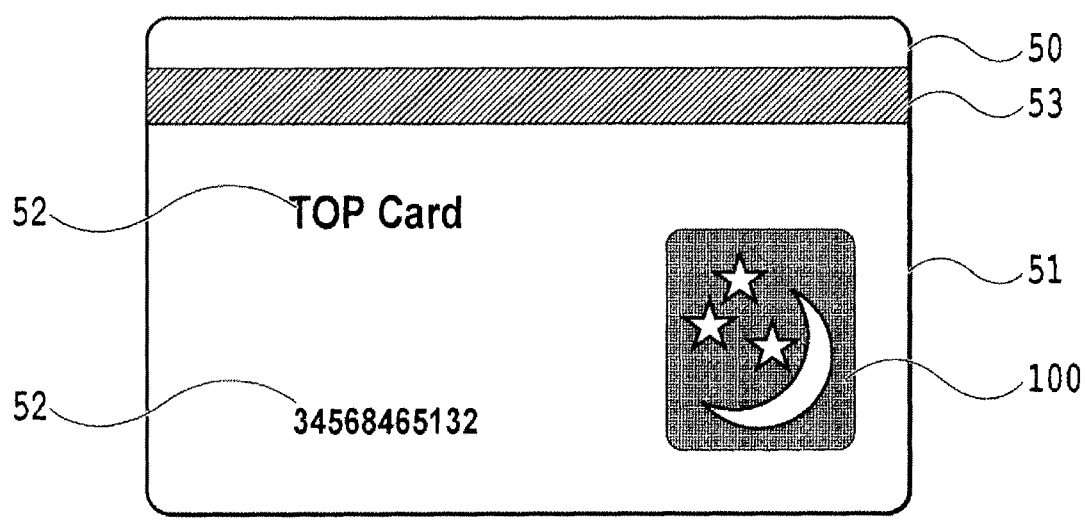
FIG. 16 is a schematic plan view illustrating an example of an information medium including the display of the present invention.

FIG. 16 schematically illustrates an example of an information medium including the display of the present invention. An information medium 50 shown in FIG. 16 is, for example, a magnetic card provided with a base 51 thereon in which a printed layer 52 and a band-shaped magnetic recording layer 53 are formed. For example, the base 51 is made of plastic. A display 100 as described above is adhered onto the base 51, for use in counterfeit prevention.

The information medium 50 includes the display 100. Therefore, it is difficult to imitate or counterfeit the information medium 50. Further, if the base 51 is light transmissive, a colored watermark image can be observed. Accordingly, it is preferable that the base 51 of the information medium 50 is light transmissive.

Example 1

Figure 17:
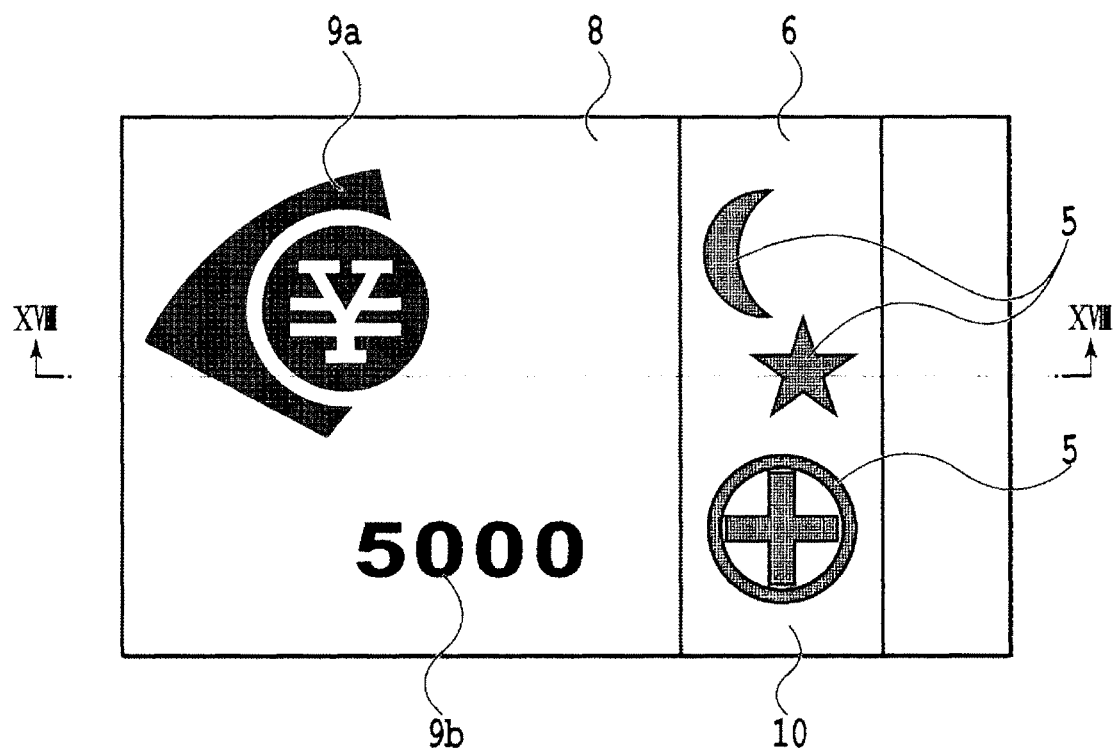
FIG. 17 is a schematic plan view illustrating still another example of the display of the present invention.
Figure 18:
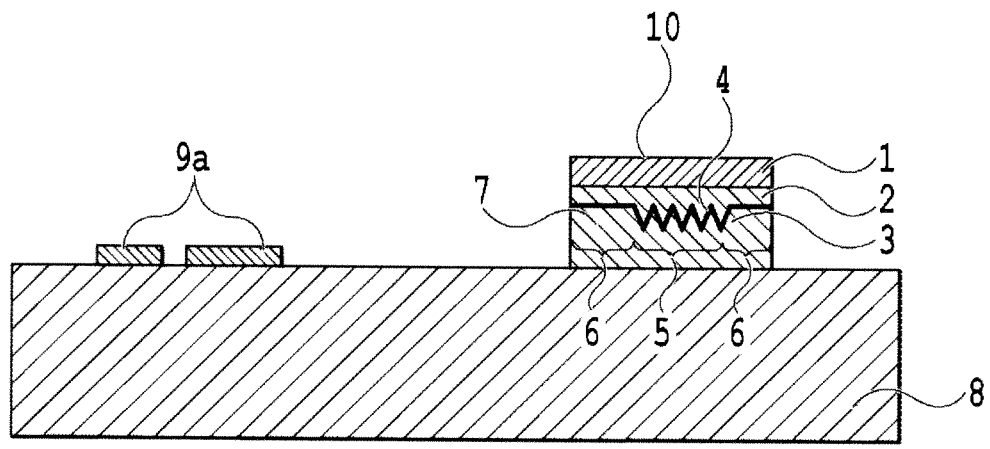
FIG. 18 is a vertical cross-sectional view taken along the line XVIII-XVIII of the display illustrated in FIG. 17.

FIGS. 17 and 18 schematically illustrate an example of the display of the present invention. The display 10 includes a polyethylene terephthalate (PET) film as the transparent base 1, an ultraviolet curable resin as the structure-forming layer 2, and a diffraction grating with the cycle P and the height H of the order of several hundred nm as the concavo-convex structures 4 arranged in the respective structure areas 5. A plurality of structure areas 5 are provided having respective concavo-convex structures 4 which have different cycles P and heights H.

In the example shown in FIG. 17, the structure areas 5 are provided as designs in the form such as of a star or a crescent. The structure areas 5 may be provided in any pattern. Further, the method for forming the diffraction grating used for the concavo-convex structures 4 may be a method using a laser exposure/interference system, or the diffraction grating may be formed by electron beam drawing, or the like.

The light reflection layer 3 was formed by making a film of an aluminum deposition layer using a vacuum vapor deposition method. In forming the layer, deposition was carried out using a mask that covered the non-structure areas 6 where no concavo-convex structure 4 was formed so that the aluminum deposition layer was provided to only the structure areas 5.

As the protective layer 7, a thermosetting adhesive that is curable with heat was used. By adhering the transparent member 8 and the protective layer 7, the display 10 integrated with the transparent member 8 was obtained.

A PET film thicker than the transparent member 1 was used as the transparent member 8. A symbol 9a and letters 9b were formed by a printing ink in a region of the transparent member 8, to which the protective layer 7 was not adhered.

In a positional relationship as illustrated in FIG. 8, the light transmitted through the display 10 shown in FIG. 17 was observed. The light transmitted through the structure areas 5 was observed with specific hues. In this case, the symbol 9a and the letters 9b formed by the printing ink in the non-structure areas 6 or the transparent member 8 were each observed as a monochrome grayscale image. Therefore, the light transmitted through the structure areas 5 was visually observed, being emphasized.

On the other hand, when the display 10 shown in FIG. 17 was observed in a positional relationship as in the example shown in FIG. 9, the colors of the symbol 9a and the letters 9b formed by the printing ink in the transparent member 8 were visually recognized. Further, a specific observation angle enabled observation of the diffracted light from the diffraction grating formed in the structure areas 5. When the display 10 was inclined or the observation angle was varied, the wavelength of the observable diffracted light was varied and iridescently shining light was visually observed.

Example 2

As the transparent base 1, a polyethylene terephthalate (PET) film was used. As the transparent forming layer 2, an ultraviolet-curable resin was used. As the concavo-convex structures 4 arranged in the respective structure areas 5, a diffraction grating having the cycle P of 300 to 600 nm and the height H of 100 nm to 500 nm was formed.

A plurality of combinations of the structure areas of different heights were provided and the cycles P were ensured to be different between the combinations. The diffraction grating used for the concavo-convex structures 4 was formed by electron beam drawing. A film of the light reflection layer 3 was formed by forming an aluminum deposition layer using a vacuum vapor deposition method.

The transparent member 8 was formed on the protective layer 7. By adhering the transparent member 8 and the protective layer 7, the display 10 integrated with the transparent member 8 was obtained. As the transparent member 8, a PET film thicker than the transparent base 1 was used. Further, symbols and letters were formed by a printing ink in a region of the transparent member 8, to which the protective layer 7 was not adhered.

When the transmitted light from the display prepared in the present example was observed in a positional relationship as illustrated in FIG. 8, the light transmitted through the structure areas 5 was observed with specific hues. In this case, the symbols and letters formed by the printing ink in the non-structure areas 6 and the transparent member 8 were observed as a monochrome grayscale image. Therefore, the light transmitted through the structure areas 5 was visually recognized, being emphasized.

On the other hand, when the display of the present example was observed in a positional relationship as in an example illustrated in FIG. 9, the colors of the printing ink formed in the transparent member 8 were visually recognized. Further, a specific observation angle enabled observation of the diffracted light from the diffraction grating formed in the structure areas 5. When the display 10 was inclined or the observation angle was varied, the wavelength of the observable diffracted light was varied and iridescently shining light was visually observed.

It should be noted that the present invention should not be construed as being limited to the various embodiments and examples described above. The present invention encompasses a display obtained by further adding optional layers to the displays described in the various embodiments and examples. The present invention encompasses a display obtained by selecting elements from the displays described in the various embodiments and examples and combining the selected elements.

1, 11 Transparent base
   2, 12 Structure-forming layer
   3, 13 Light reflection layer
   4 Concavo-convex structure
   5, 15a, 15b Structure area
   6, 16 Non-structure area
   7, 17 Protective layer
   8, 18 Transparent member
   9a Symbol 9b Letter
10, 20, 100 Display
21 Observer
22 Light source
50 Information medium
51 Base
52 Printed layer
53 Magnetic recording layer

What is claimed is:

1. A display, comprising:
a transparent base having one surface on which a structure-forming layer, a light reflection layer, and a protective layer are sequentially laminated,
with the light reflection layer reflecting a part of light passing therethrough, while transmitting therethrough another part of the light; and
the structure-forming layer includes a) a plurality of structure areas that are formed of a concavo-convex structure and b) a plurality of non-structure areas, where no concave-convex structure is formed, wherein the light reflection layer covers each structure area of the plurality of structure areas and each non-structure area of the plurality of non-structure areas of the structure-forming layer, wherein the protective layer has a surface on a side not contacting the reflection layer, this surface being provided with a transparent member having light scattering properties and wherein the transparent member is thicker than the transparent base.

2. The display of claim 1, wherein the plurality of structure areas are configured to have differences in at least one of the following parameters: height, cycle, width of convexity, and width of concavity of the concavo-convex structure, so that light transmitted through the plurality of structure areas has different dominant wavelengths.

3. The display of claim 1, wherein the plurality of structure areas are configured to display at least one image, selected from mutually different designs, letters, and numerals.

4. The display of claim 1, wherein each structure area of said plurality of structure areas having a transmittance of more than about 20% and each non-structure area of said plurality of non-structure areas having a transmittance of not more than about 20%.

5. The display of claim 1, wherein the plurality of structure areas includes concavo-convex structures having different heights.

6. The display of claim 1, wherein the concavo-convex structure includes two kinds of different structures, one being a concavo-convex structure having a larger height that the other structure and the other being a concavo-convex structure having a smaller height than the other structure, and with the concavo-convex structure having a larger height and the concavo-convex structure having a smaller height being alternately arranged.

7. The display of claim 1, wherein the concavo-convex structure has a maximum height of not less than 250 nm but not more than 600 nm.

8. The display of claim 1, wherein the concavo-convex structure has a minimum height of not less than 10 nm but not more than 200 nm.

9. The display of claim 1, wherein the concavo-convex structure has a cycle of not less than 300 nm but not more than 800 nm.

10. The display of claim 1, wherein at least some of the plurality of structure areas are equal in cycle and height of the concavo-convex structure, but are different in width of concavity or width of convexity, or both, of the concavo-convex structure.

11. The display of claim 1, wherein the protective layer has a surface on a side not contacting the light reflection layer, this surface being provided with a transparent member that is configured to be a concavo-convex structure so that at least a part of the transparent member has light scattering properties.

12. The display of claim 1, wherein the transparent base has a surface on a side not contacting the structure-forming layer, this surface being further provided with a concavo-convex structure to allow at least a part of the transparent member to have light scattering properties.

13. The display of claim 1, wherein the concavo-convex structure has a longitudinal profile in a wind ripple pattern.

14. The display of claim 1, wherein the concavo-convex structure is configured as a diffraction grating.

15. The display of claim 1, wherein at least a part of the concavo-convex structure is a linear structure.

16. The display of claim 1, wherein at least a part of the plurality of structure areas are arranged in a matrix pattern.

17. The display of claim 1, wherein the light reflection layer is a thin aluminum film formed by a vapor phase deposition method that is one selected from a group consisting of vacuum vapor deposition methods and sputtering methods.

18. The display of claim 1, wherein light transmitted through the structure area has a dominant wavelength that falls within a visible light range.

19. The display of claim 1, wherein the display further includes a transparent member, and the protective layer has adhesiveness so that the protective layer can be joined to the light reflection layer and the transparent member.

20. An information medium including the display of claim 1.

21. The display of claim 1, wherein the light reflection layer is an aluminum film having a thickness of no less than 20 nm in portions of the light reflection layer covering the non-structure areas of the structure-forming layer.

* * * * *